United States Patent
Yeon

(10) Patent No.: US 9,477,066 B2
(45) Date of Patent: Oct. 25, 2016

(54) IMAGING LENS

(71) Applicant: LG INNOTEK CO., LTD., Seoul (KR)

(72) Inventor: Byoung Yun Yeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/361,192

(22) PCT Filed: Dec. 6, 2012

(86) PCT No.: PCT/KR2012/010511
§ 371 (c)(1),
(2) Date: May 28, 2014

(87) PCT Pub. No.: WO2013/089385
PCT Pub. Date: Jun. 20, 2013

(65) Prior Publication Data
US 2014/0355137 A1    Dec. 4, 2014

(30) Foreign Application Priority Data
Dec. 13, 2011    (KR) ........................ 10-2011-0133870

(51) Int. Cl.
G02B 13/18    (2006.01)
G02B 9/34    (2006.01)
G02B 13/00    (2006.01)
G02B 5/00    (2006.01)
G02B 27/00    (2006.01)

(52) U.S. Cl.
CPC ............... *G02B 9/34* (2013.01); *G02B 13/004* (2013.01); *G02B 13/0015* (2013.01); *G02B 5/005* (2013.01); *G02B 13/001* (2013.01); *G02B 13/002* (2013.01); *G02B 13/18* (2013.01); *G02B 27/0025* (2013.01)

(58) Field of Classification Search
CPC .. G02B 13/004; G02B 9/34; G02B 27/0025; G02B 5/005; G02B 13/0015; G02B 13/001; G02B 13/002
USPC .......................... 359/715, 738, 739, 771–773
See application file for complete search history.

(56) References Cited

U.S. PATENT DOCUMENTS

| | | | |
|---|---|---|---|
| 7,969,664 B2 * | 6/2011 | Tang | G02B 13/004 359/715 |
| 8,451,546 B2 * | 5/2013 | Iba | G02B 9/34 359/715 |
| 2009/0231734 A1 * | 9/2009 | Choi | 359/784 |

FOREIGN PATENT DOCUMENTS

| | | |
|---|---|---|
| JP | 2004-341512 A | 12/2004 |
| JP | 2006-003569 A | 1/2006 |
| JP | 2006-126494 A | 5/2006 |
| JP | 2008-129506 A | 6/2008 |
| KR | 10-2009-0098200 A | 9/2009 |

OTHER PUBLICATIONS

WO 2011/061882 A1; published on May 26, 2011; and is directly related to the U.S. Pat. No. 8,451,546 B2 listed above.*
International Search Report in International Application No. PCT/KR2012/010511, filed Dec. 6, 2012.

* cited by examiner

*Primary Examiner* — Evelyn A Lester
(74) *Attorney, Agent, or Firm* — Saliwanchik, Lloyd & Eisenschenk

(57) ABSTRACT

The present invention relates to an imaging lens, the imaging lens including, in an ordered way from an object side, a first lens having a positive (+) refractive power, a second lens having a negative (−) refractive power, a third lens having a positive (+) refractive power, and a fourth lens having a negative (−) refractive power and having a negative (−) refractive power from a lens center to a lens outer edge.

13 Claims, 5 Drawing Sheets

IMAGING LENS

CROSS-REFERENCE TO RELATED APPLICATIONS

This application is the U.S. national stage application of International Patent Application No. PCT/KR2012/010511, filed Dec. 6, 2012, which claims priority to Korean Application No. 10-2011-0133870, filed Dec. 13, 2011, the disclosures of each of which are incorporated herein by reference in their entirety.

TECHNICAL FIELD

The teachings in accordance with exemplary embodiments of this invention relate generally to an imaging lens.

BACKGROUND ART

Vigorous research efforts are being made recently in the field of a mobile phone-purpose camera module, a digital still camera (DSC), a camcorder, and a PC camera (an imaging device attached to a person computer) all connected with an image pickup system. One of the most important components for a camera module related to the image pickup system to obtain an image is an imaging lens that produces an image.

Recently, an optical lens system is constructed by using 3 or 4 pieces of lenses for realization of compactness and low cost.

For example, one known art in the related field, Korea Laid-Open Patent No. 2005-0014108 has attempted to construct a compact optical system using 4 pieces of lenses adequate enough to be mounted on a small sized information terminal.

However, although the 4-piece lens system may be advantageous in terms of price, but in some cases, an image module of the above-mentioned structure fails to show satisfactory optical properties or aberration properties, and thus a high resolution imaging lens having a power structure is required.

DISCLOSURE OF INVENTION

Technical Problem

Accordingly, embodiments of the present invention may relate to an imaging lens that substantially obviates one or more of the above disadvantages/problems due to limitations and disadvantages of related art, and the present invention is to provide an imaging lens configured to realize a super-slim size with a high resolution.

Solution to Problem

In one general aspect of the present invention, there is provided an imaging lens, the imaging lens comprising, in an ordered way from an object side: a first lens having a positive (+) refractive power; a second lens having a negative (−) refractive power; a third lens having a positive (+) refractive power; and a fourth lens having a negative (−) refractive power and having a negative (−) refractive power from a lens center to a lens outer edge.

Preferably, but not necessarily, the first lens has a meniscus shape to an object side surface.

Preferably, but not necessarily, the second lens has a concave shape at both sides.

Preferably, but not necessarily, the third lens has a convex shape to an image side surface.

Preferably, but not necessarily, the fourth lens has a meniscus shape from an optical axis to an object side surface.

Preferably, but not necessarily, the imaging lens meets a conditional expression of f3C/f3L>0, where a refractive power at a lens center of the third lens is f3C, and a refractive power at an outer edge of the third lens is f3L.

Preferably, but not necessarily, the imaging lens meets a conditional expression of f4C/f4L>0, where a refractive power at a lens center of the fourth lens is f4C, and a refractive power at an outer edge of the fourth lens is f4L.

Preferably, but not necessarily, the imaging lens meets a conditional expression of 1<|f3/f4|<1.3, where a focal distance of the third lens is f3, and a focal distance of the fourth lens is f4.

Preferably, but not necessarily, the imaging lens meets a conditional expression of 0.5<|f4/f|<1.0, where an entire focus distance of the imaging lens is f, and a focus distance of the fourth lens is f4.

Preferably, but not necessarily, the imaging lens meets a conditional expression of 0.7<R7/f<1.2, where an entire focus distance of the imaging lens is f, and a radius of curvature of an object side surface of the fourth lens is R7.

Preferably, but not necessarily, the imaging lens meets a conditional expression of 0<R8/f<0.5, where an entire focus distance of the imaging lens is f, and a radius of curvature of an image side surface of the fourth lens is R8.

Preferably, but not necessarily, the imaging lens meets a conditional expression of 1<(R7+R8)/(R7−R8)<3, where a radius of curvature of an object side surface of the fourth lens is R7, and a radius of curvature of an image side surface of the fourth lens is R8.

Preferably, but not necessarily, the imaging lens further comprises an aperture stop positioned at an object side surface of the first lens.

Preferably, but not necessarily, the imaging lens meets a conditional expression of TL/f<1.25, where a distance from the aperture stop to an image surface is TL, and an entire focus distance of the imaging lens is f.

Preferably, but not necessarily, the imaging lens meets a conditional expression of (R1+R2)/(R1−R2) <0, where a radius of curvature of an object side surface of the first lens is R1, and a radius of curvature of an image side surface of the first lens is R2.

Preferably, but not necessarily, the imaging lens meets a conditional expression of 0<(R3+R4)/(R3−R4)<1, where a radius of curvature of an object side surface of the second lens is R3, and a radius of curvature of an image side surface of the second lens is R4.

Preferably, but not necessarily, a distance from an aperture stop to an image surface is less than 4 mm.

In another general aspect of the present invention, there is provided an imaging lens, the imaging lens comprising, in an ordered way from an object side: a first movable lens having a positive (+) refractive power; a second lens having a negative (−) refractive power; a third lens having a positive (+) refractive power; and a fourth lens having a negative (−) refractive power, and the imaging lens meets a conditional expression of f3C/f3L>0, where a refractive power at a lens center of the third lens is f3C, and a refractive power at an outer edge of the third lens is f3L.

Preferably, but not necessarily, the fourth lens has a meniscus shape from an optical axis to an object side surface.

In still another general aspect of the present invention, there is provided an imaging lens, the imaging lens comprising, in an ordered way from an object side: a first movable lens having a positive (+) refractive power; a second lens having a negative (−) refractive power; a third lens having a positive (+) refractive power; and a fourth lens having a negative (−) refractive power, and the imaging lens meets a conditional expression of f4C/f4L>0, where a refractive power at a lens center of the fourth lens is f4C, and a refractive power at an outer edge of the fourth lens is f4L.

Advantageous Effects of Invention

The imaging lens according to the present invention has an advantageous effect in that 4 sheets of lenses are configured to realize a super-slim imaging lens with a high resolution.

BEST MODE FOR CARRYING OUT THE INVENTION

Hereinafter, exemplary embodiments of the present invention will be described in detail with reference to the accompanying drawings.

Figure 1:
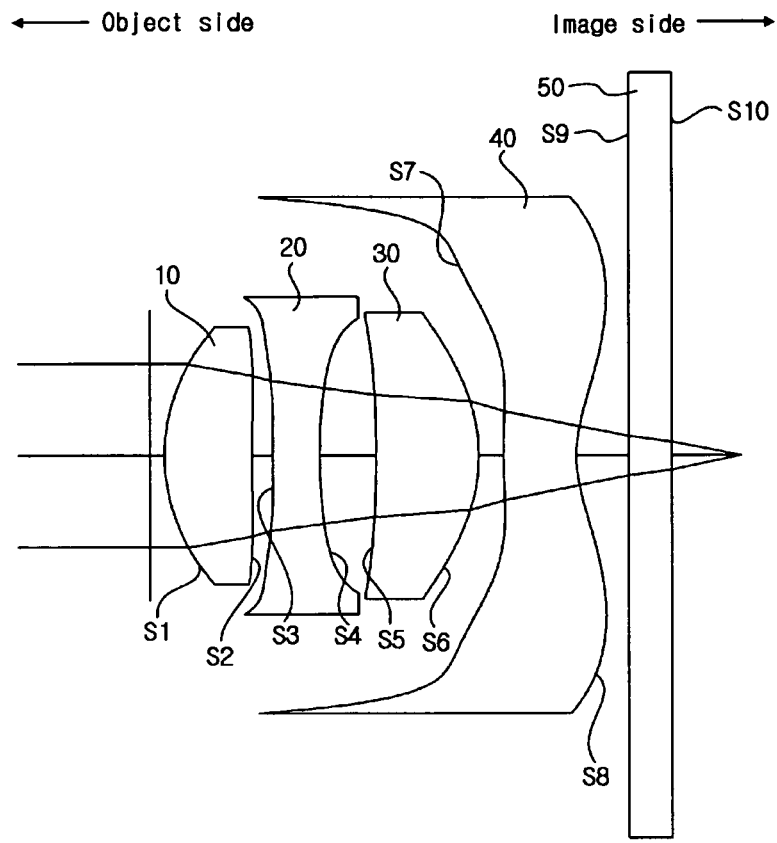
FIG. 1 is a constructional view illustrating a camera lens module according to an exemplary embodiment of the present invention.
Figure 2A:
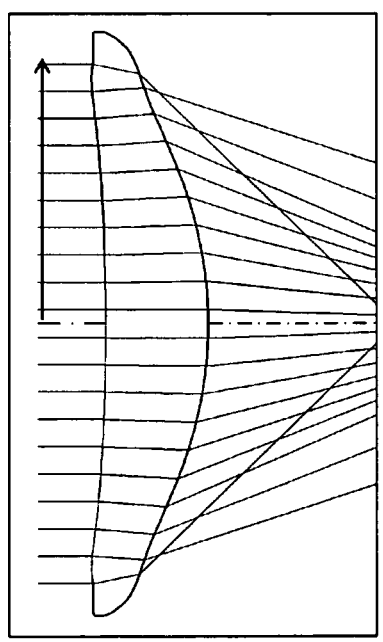
FIGS. 2a and 2b are graphs illustrating changes in refractivity relative to lens height of a third lens according to an exemplary embodiment of the present invention.
Figure 2B:
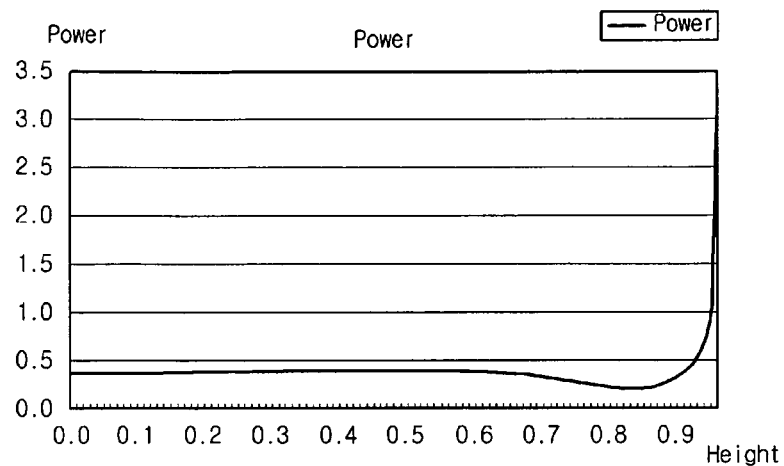
Figure 3A:
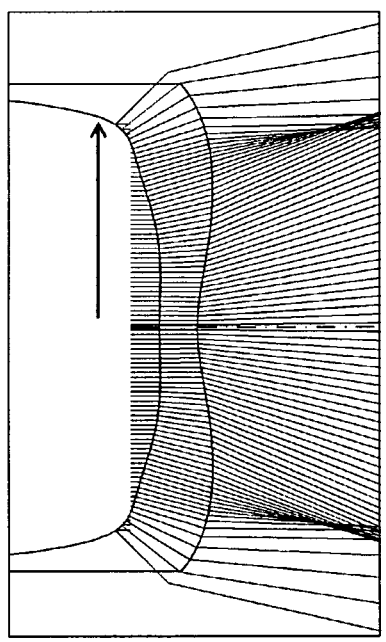
FIGS. 3a and 3b are graphs illustrating changes in refractivity relative to lens height of a fourth lens according to an exemplary embodiment of the present invention.
Figure 3B:
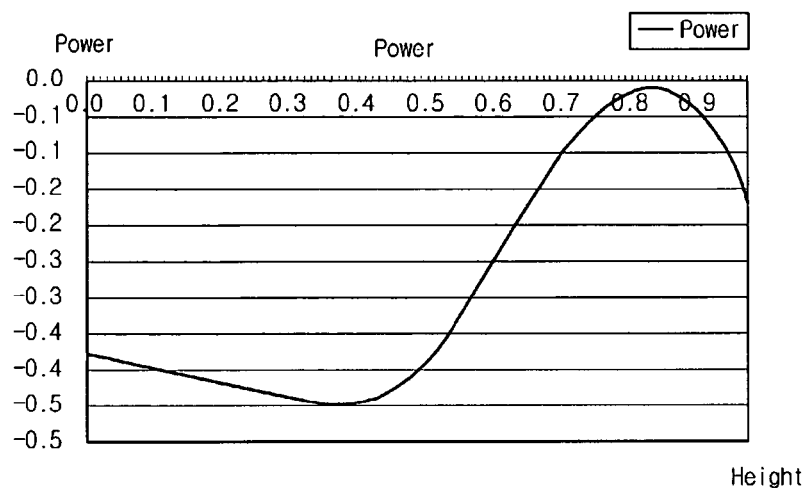

FIG. 1 is a constructional view illustrating a camera lens module according to an exemplary embodiment of the present invention, FIGS. 2a and 2b are graphs illustrating changes in refractivity relative to lens height of a third lens according to an exemplary embodiment of the present invention, and FIGS. 3a and 3b are graphs illustrating changes in refractivity relative to lens height of a fourth lens according to an exemplary embodiment of the present invention.

The imaging lens formed with a plurality of lenses is arranged about an optical axis according to an exemplary embodiment of the present invention, where thickness, size, and shape of each lens are rather overdrawn in FIG. 1 for description, and a spherical shape or an aspheric shape has been only presented as one exemplary embodiment, but obviously not limited to this shape.

Referring to FIG. 1, a camera lens module according to an exemplary embodiment of the present invention includes, in an ordered way from an object side, a first lens (10), a second lens (20), a third lens (30), a fourth lens (40), a filter (50) and a photo-detector (not shown).

Light corresponding to image information of a subject is incident on the photo-detector by passing the first lens (10), the second lens (20), the third lens (30), the fourth lens (40) and the filter (50).

Hereinafter, in the description of the construction of each lens, "object side surface" means a surface of a lens facing an object side with respect to an optical axis, and an image side surface means a surface of a lens facing a capturing surface with respect to an optical axis.

The first lens (10) has a positive (+) refractive power, and the first lens (10) has a meniscus shape to an object side surface. The second lens (20) has a negative (−) refractive power and has a concave shape at both sides. Furthermore, the third lens (30) has a positive (+) refractive power, and the third lens (30) has a convex shape to an image side surface.

That is, as shown in FIG. 2a, light is converged in the third lens (30), and the third lens (30) has a positive (+) refractive power as shown in FIG. 2b.

A lens center of the fourth lens (40) has a negative (−) refractive power, and takes a meniscus shape from an optical axis to an object side surface, and has a negative (−) refractive power all the way from the lens center to a lens ambience. That is, as shown in FIG. 3a, light is diverged in the fourth lens (40) and the fourth lens (40) has a negative (−) refractive power, as shown in FIG. 3b.

Thus, the imaging lens according to the present invention can realize a super-slim imaging lens with a high resolution configured with 4 sheets of lenses.

For information, 'S1' and 'S2' of FIG. 1 are respectively an object side surface and an image side surface of the first lens (10), 'S2' and 'S4' are respectively an object side surface and an image side surface of the second lens (20), 'S5' and 'S6' are respectively an object side surface and an image side surface of the third lens (30), 'S7' and 'S8' are respectively an object side surface and an image side surface of the fourth lens (40), 'S9' and 'S10' are respectively an object side surface and an image side surface of the filter (50).

The filter (50) may be any one optical filter selected from an infrared filter and a cover glass. The filter (50), if applied with the infrared filter, prevents radiant heat emitted from external light from being transferred to the photo-detector. Furthermore, the infrared filter transmits visible light and reflects and outputs infrared rays to the outside. The photo-detector is an image sensor, for example, CCD (Charge Coupled Device) or CMOS (Complementary Metal Oxide Semiconductor), etc.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

| | |
|---|---|
| $f3C/f3L>0$ | [Conditional expression 1] |
| $f4C/f4L>0$ | [Conditional expression 2] |
| $1<|f3/f4|<1.3$ | [Conditional expression 3] |
| $0.5<|f4/f|<1.0$ | [Conditional expression 4] |
| $0.7<R7/f<1.2$ | [Conditional expression 5] |
| $0<R8/f<0.5$ | [Conditional expression 6] |
| $1<(R7+R8)/(R7-R8)<3$ | [Conditional expression 7] |
| $TL/f<1.25$ | [Conditional expression 8] |

$(R1+R2)/(R1-R2)<0$ [Conditional expression 9]

$0<(R3+R4)/(R3-R4)<1$ [Conditional expression 10]

where, f3C: refractive power of lens center at the third lens
f3L: refractive power of the third lens outer edge
f4C: refractive power of lens center at the fourth lens
f4L: refractive power of the fourth lens outer edge
f3: focal distance of third lens
f4: focal distance of fourth lens
f: an entire focus distance of the imaging lens
R1: a radius of curvature of an object side surface of the first lens
R2: a radius of curvature of an image side surface of the first lens
R3: a radius of curvature of an object side surface of the second lens
R4: a radius of curvature of an image side surface of the second lens
R7: a radius of curvature of an object side surface of the fourth lens
R8: a radius of curvature of an image side surface of the fourth lens
TL: a distance from aperture stop to image surface At this time, positions of the aperture stop are in the order of aperture, the first lens, the second lens, the third lens and the fourth lens. That is, the aperture stop is positioned at an object side surface of the first lens. Furthermore, a distance from the aperture stop to the image surface may be less than 4 mm.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes 10.sup.1, and E-02 denotes 10.sup.-2.

MathFigure 1

$$z = \frac{cY^2}{1+\sqrt{1-(1+K)c^2Y^2}} + AY^4 + BY^4 + CY^4 + DY^4 + EY^4 + FY^4$$ [Math. 1]

where, z: distance from the lens's top-point to an optical axis direction,
c: basic curvature of a lens, Y: distance towards a direction perpendicular to an optical axis, K: conic constant, and A, B, C, D, E, F: aspheric coefficients

EXEMPLARY EMBODIMENTS

The following Table 1 shows an exemplary embodiment matching the aforementioned conditional expressions.

TABLE 1

|  | Exemplary embodiment |
| --- | --- |
| f3C | 2.71 |
| f3L | 0.31 |
| f4C | -2.64 |
| f4L | -5.87 |
| f3 | 2.71 |
| f4 | -2.64 |

TABLE 1-continued

|  | Exemplary embodiment |
| --- | --- |
| f | 3.2 |
| R7 | 3.10 |
| R8 | 0.91 |
| TL | 3.95 mm |

Referring to Table 1, it can be noted that f1/fz1 is 0.73 that matches the conditional expression 1, and |f2/fz1| is 0.95 that matches the conditional expression 8.

The following Table 2 shows an exemplary embodiment which is a more detailed exemplary embodiment over that of Table 1.

TABLE 2

| Surface numbers | Radius of curvature (R) | Thickness or distance (d) | Refractive index (N) |
| --- | --- | --- | --- |
| 1* | 1.30 | 0.6 | 1.53 |
| 2* | 15.00 | 0.15 |  |
| 3* | -16.7 | 0.33 | 1.63 |
| 4* | 4.16 | 0.38 |  |
| 5* | -6.15 | 0.7 | 1.53 |
| 6* | -1.20 | 0.17 |  |
| 7* | 3.10 | 0.5 | 1.53 |
| 8* | 0.91 | 0.35 |  |
| 9 | Infinity | 0.30 | 1.52 |
| 10 | Infinity | 0.4 |  |
| image | Infinity | 0 |  |

The notation * in the above Table 2, which is further written near the surface number, indicates aspheric.

Mode for the Invention

Figure 4A:
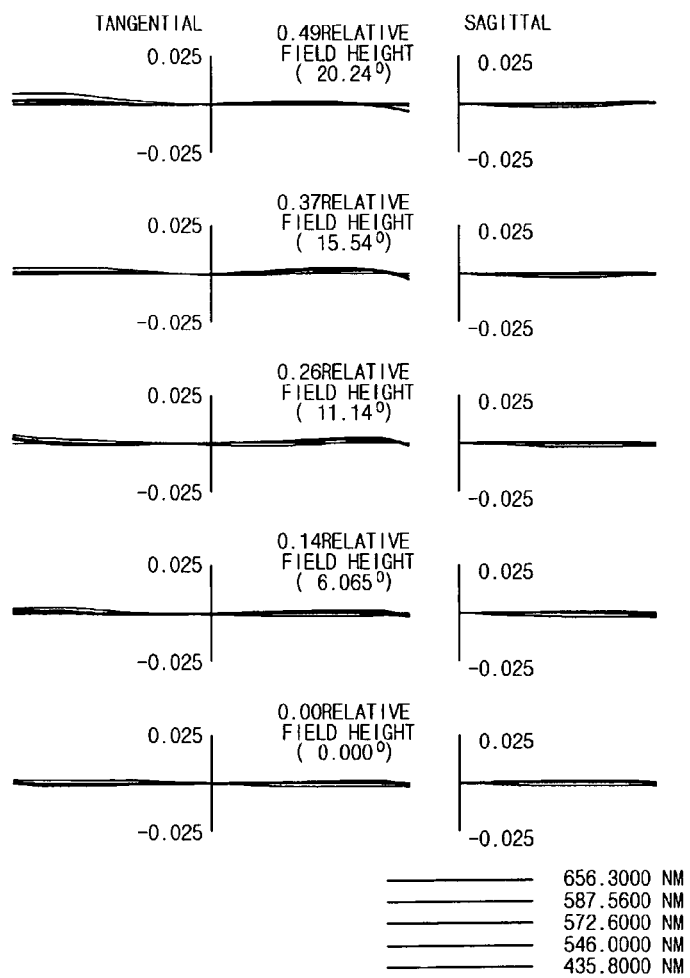
FIGS. 4a and 4b are graphs illustrating a measured coma aberration according to an exemplary embodiment of the present invention.
Figure 4B:
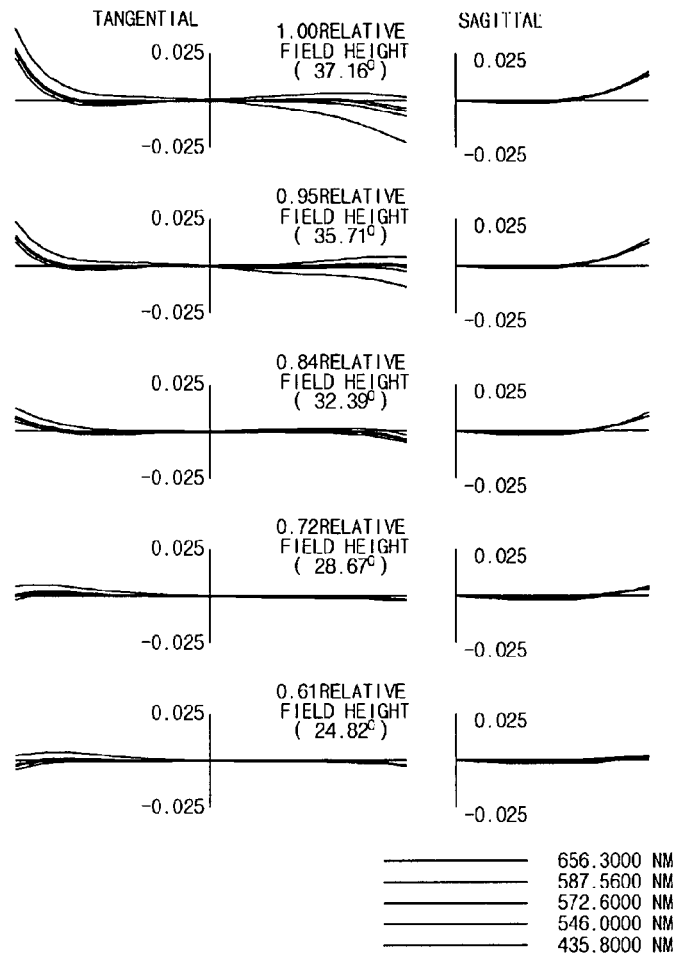

FIGS. 4a and 4b are graphs illustrating a measured coma aberration according to an exemplary embodiment of the present invention, where tangential aberration and sagittal aberration of each wavelength based on a field height are measured. In FIGS. 4a and 2b, it is interpreted that a coma aberration correcting function is good as curves approach the X axis from a positive axis and a negative axis. In the measurement examples of FIGS. 4a and 4b of shown aberration diagrams, because values of images in nearly all fields proximate to the X axis, it is interpreted that coma aberration correction function demonstrates a superior figure.

Figure 5A:
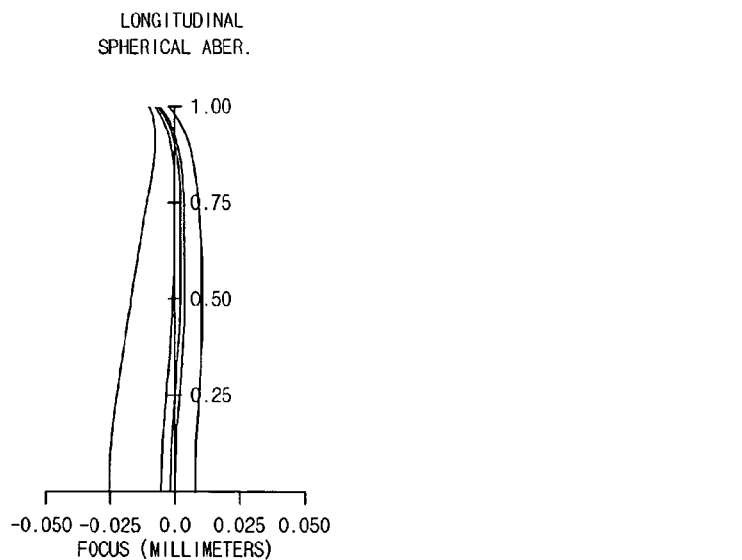
FIGS. 5a, 5b and 5c are graphs illustrating aberration according to an exemplary embodiment of the present invention.
Figure 5B:
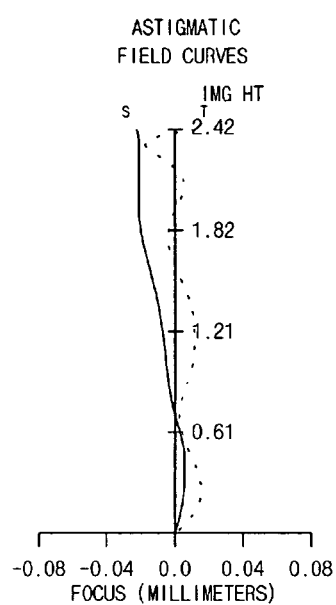
Figure 5C:
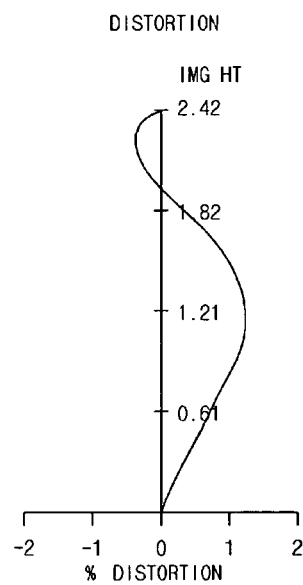

FIGS. 5a, 5b and 5c are graphs illustrating aberration according to an exemplary embodiment of the present invention, where longitudinal spherical aberration, astigmatic field curves and distortion are measured in order from left side.

In FIGS. 5a, 5b and 5c, a Y axis means size of an image, and an X axis means focal distance (unit: mm) and distortion degree (unit: %). In FIGS. 5a, 5b and 5c, it is interpreted that an aberration correcting function is good as curves approach the Y axis. In the shown aberration diagram, because values of images in nearly all fields appear proximate to the Y axis, spherical aberration, astigmatic field curves and distortion all demonstrate a superior figure.

That is, a range of the longitudinal spherical aberration is -0.026 mm~+0.0125 mm, a range of astigmatic field curves is -0.023 mm~+0.015 mm, and a range of distortion is -1.04 mm~+1.25 mm, such that the imaging lens according to the present invention can correct the characteristics of spherical aberration, astigmatic field curves and distortion, whereby the imaging lens according to the present invention has an excellent lens characteristics.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the imaging lens according to the exemplary embodiments of the present invention has an industrial applicability in that 4 sheets of lenses are configured to realize a super-slim imaging lens with a high resolution.

The invention claimed is:

1. An imaging lens comprising, in an ordered way from an object side:
   a first lens having a positive (+) refractive power and a meniscus shape convex to an object side surface;
   a second lens having a negative (−) refractive power and a concave shape at both sides thereof;
   a third lens having a positive (+) refractive power and a meniscus shape convex to an image side surface; and
   a fourth lens having a negative (−) refractive power and a meniscus shape convex to an object side surface;
   wherein the imaging lens meets a conditional expression of f3C/f3L>0, where a refractive power at a lens center of the third lens is f3C, and a refractive power at an outer edge of the third lens is f3L;
   wherein the imaging lens meets a conditional expression of f4C/f4L>0, where a refractive power at a lens center of the fourth lens is f4C, and a refractive power at an outer edge of the fourth lens is f4L; and
   wherein the imaging lens meets a conditional expression of 1<|f3/f4|<1.3, where a focal distance of the third lens is f3, and a focal distance of the fourth lens is f4.

2. The imaging lens of claim 1, wherein the imaging lens meets a conditional expression of 0.5<|f4/f|1.0, where an entire focus distance of the imaging lens is f, and a focus distance of the fourth lens is f4.

3. The imaging lens of claim 1, wherein the imaging lens meets a conditional expression of 0.7<R7/f<1.2, where an entire focus distance of the imaging lens is f, and a radius of curvature of an object side surface of the fourth lens is R7.

4. The imaging lens of claim 1, wherein the imaging lens meets a conditional expression of 0<R8/f<0.5, where an entire focus distance of the imaging lens is f, and a radius of curvature of an image side surface of the fourth lens is R8.

5. The imaging lens of claim 1, wherein the imaging lens meets a conditional expression of 1<(R7+R8)/(R7−R8)<3, where a radius of curvature of an object side surface of the fourth lens is R7, and a radius of curvature of an image side surface of the fourth lens is R8.

6. The imaging lens of claim 1, wherein the imaging lens further comprises an aperture stop positioned at an object side surface of the first lens.

7. The imaging lens of claim 1, wherein the imaging lens meets a conditional expression of TL/f<1.25, where a distance from the aperture stop to an image surface is TL, and an entire focus distance of the imaging lens is f.

8. The imaging lens of claim 1, wherein the imaging lens meets a conditional expression of (R1+R2)/(R1−R2)<0, where a radius of curvature of an object side surface of the first lens is R1, and a radius of curvature of an image side surface of the first lens is R2.

9. The imaging lens of claim 1, wherein the imaging lens meets a conditional expression of 0<(R3+R4)/(R3−R4)<1, where a radius of curvature of an object side surface of the second lens is R3, and a radius of curvature of an image side surface of the second lens is R4.

10. The imaging lens of claim 1, wherein a distance from an aperture stop to an image surface is less than 4mm.

11. The imaging lens of claim 1, wherein the fourth lens has a negative (−) refractive power from a lens center to a lens outer edge.

12. The imaging lens of claim 1, wherein the third lens has a positive (+) refractive power from a lens center to a lens outer edge.

13. A camera module comprising an imaging lens, wherein the imaging lens comprises, in an ordered way from an object side:
   a first lens having a positive (+) refractive power and a meniscus shape convex to an object side surface;
   a second lens having a negative (−) refractive power and a concave shape at both sides;
   a third lens having a positive (+) refractive power and a meniscus shape convex to an image side surface; and
   a fourth lens having a negative (−) refractive power and a meniscus shape convex to an object side surface;
   wherein the imaging lens meets a conditional expression of f3C/f3L>0, where a refractive power at a lens center of the third lens is f3C, and a refractive power at an outer edge of the third lens is f3L;
   wherein the imaging lens meets a conditional expression of f4C/f4L>0, where a refractive power at a lens center of the fourth lens is f4C, and a refractive power at an outer edge of the fourth lens is f4L; and
   wherein the imaging lens meets a conditional expression of 1<|f3/f4|<1.3, where a focal distance of the third lens is f3, and a focal distance of the fourth lens is f4.

* * * * *